US012613089B2

(12) United States Patent (10) Patent No.: US 12,613,089 B2
Uehara et al. (45) Date of Patent: Apr. 28, 2026

(54) STRAIN DETECTION DEVICE WITH REDUCED NUMBER OF WIRES

(71) Applicant: Japan Display Inc., Tokyo (JP)

(72) Inventors: Toshinori Uehara, Tokyo (JP);
Fumihoru Nakano, Tokyo (JP)

(73) Assignee: Japan Display Inc., Tokyo (JP)

( * ) Notice: Subject to any disclaimer, the term of this
patent is extended or adjusted under 35
U.S.C. 154(b) by 287 days.

(21) Appl. No.: 18/528,199

(22) Filed: Dec. 4, 2023

(65) Prior Publication Data

US 2024/0183646 A1 Jun. 6, 2024

(30) Foreign Application Priority Data

Dec. 5, 2022 (JP) ................................. 2022-193957

(51) Int. Cl.
G01B 7/16 (2006.01)
(52) U.S. Cl.
CPC ...................................... G01B 7/18 (2013.01)
(58) Field of Classification Search
None
See application file for complete search history.

(56) References Cited

U.S. PATENT DOCUMENTS

| | | | |
|---|---|---|---|
| 7,196,537 B2 * | 3/2007 | von Campenhausen | .................... G11C 29/48 324/762.02 |
| 7,332,717 B2 * | 2/2008 | Murata | .................. H04N 23/20 348/E5.09 |
| 10,222,231 B2 * | 3/2019 | Allen | ....................... G01D 5/14 |

FOREIGN PATENT DOCUMENTS

JP S63285434 A 11/1988

* cited by examiner

*Primary Examiner* — Eric S. McCall
*Assistant Examiner* — Nigel H Plumb
(74) *Attorney, Agent, or Firm* — K&L Gates LLP

(57) ABSTRACT

A detection device includes a bridge circuit including a first node to which a second end of a first resistance element and a first end of a second resistance element are connected, a second node to which a second end of the second resistance element and a first end of a third resistance element are connected, a third node to which a second end of the third resistance element and a first end of a strain gauge resistance element are connected, and a fourth node to which a second end of the strain gauge resistance element and a first end of the first resistance element are connected, a capacitance element between the first node and the third node, a first switch element between the fourth node and a reference power supply line, and a second switch element between the second node and a detection circuit.

9 Claims, 9 Drawing Sheets

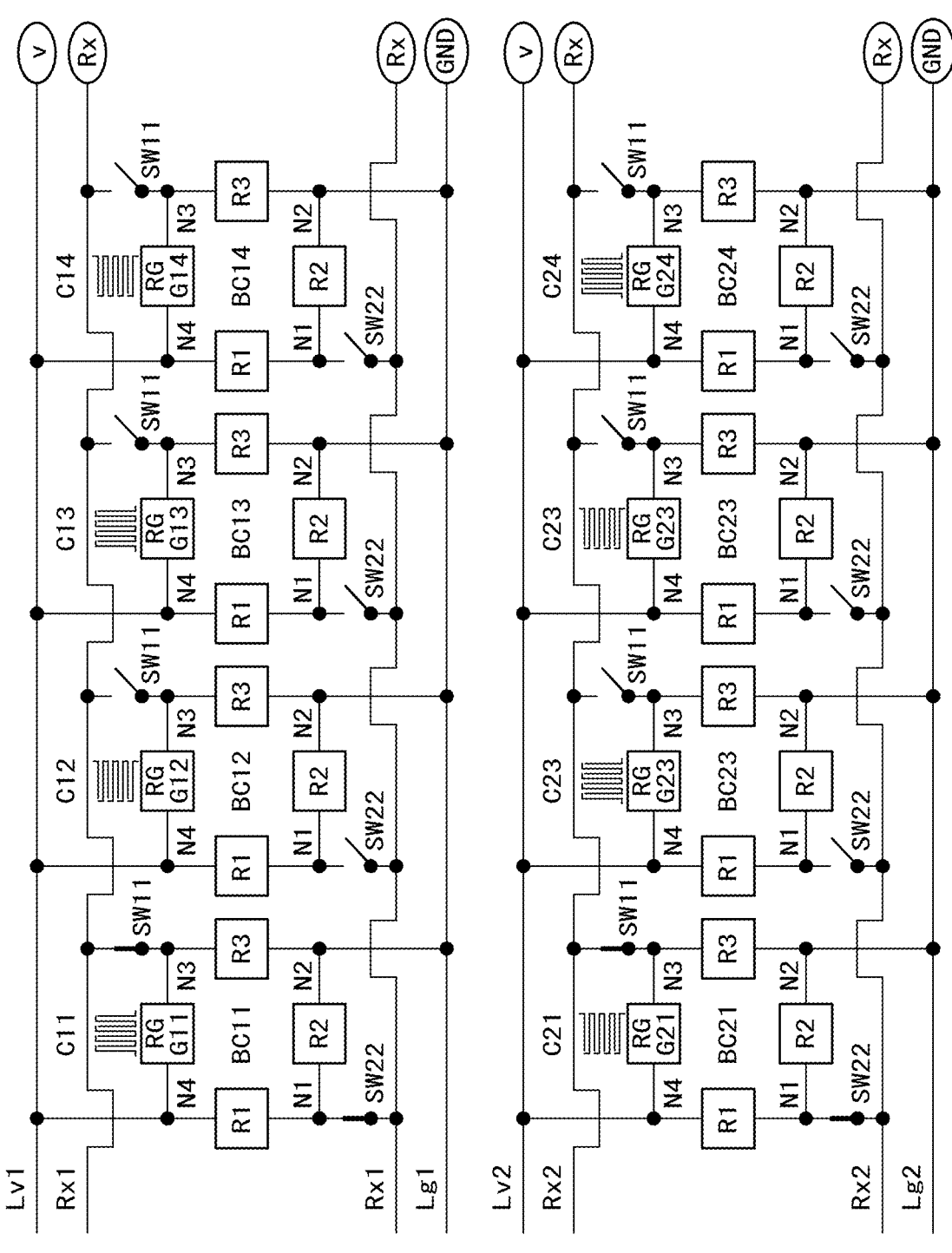
F I G . 2

F I G . 3

F I G . 4
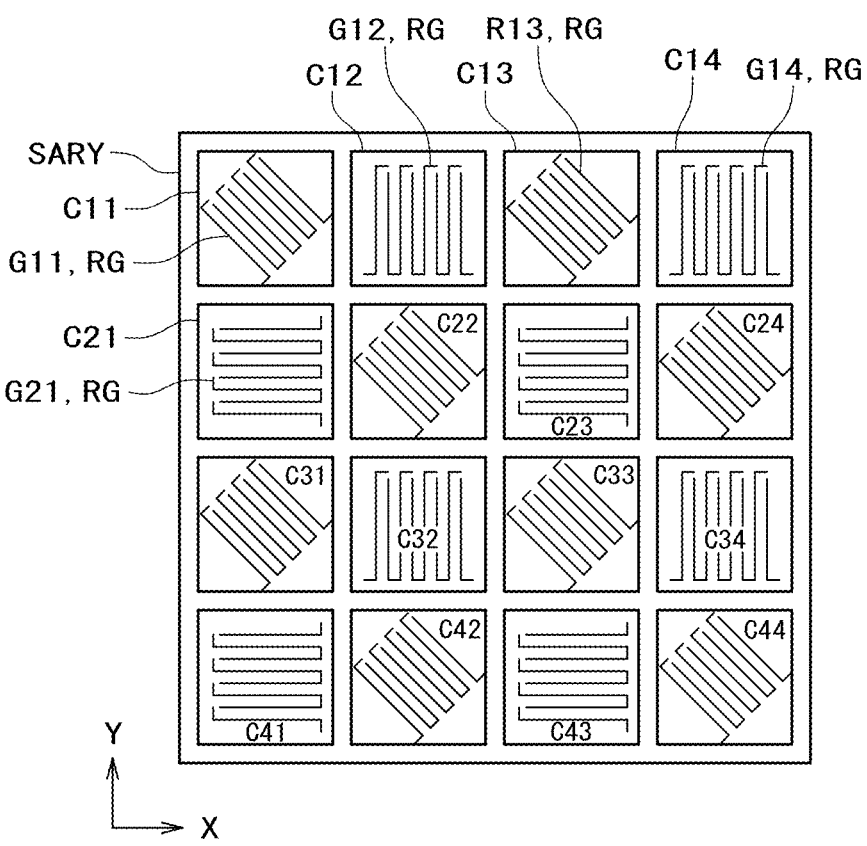

F I G . 5
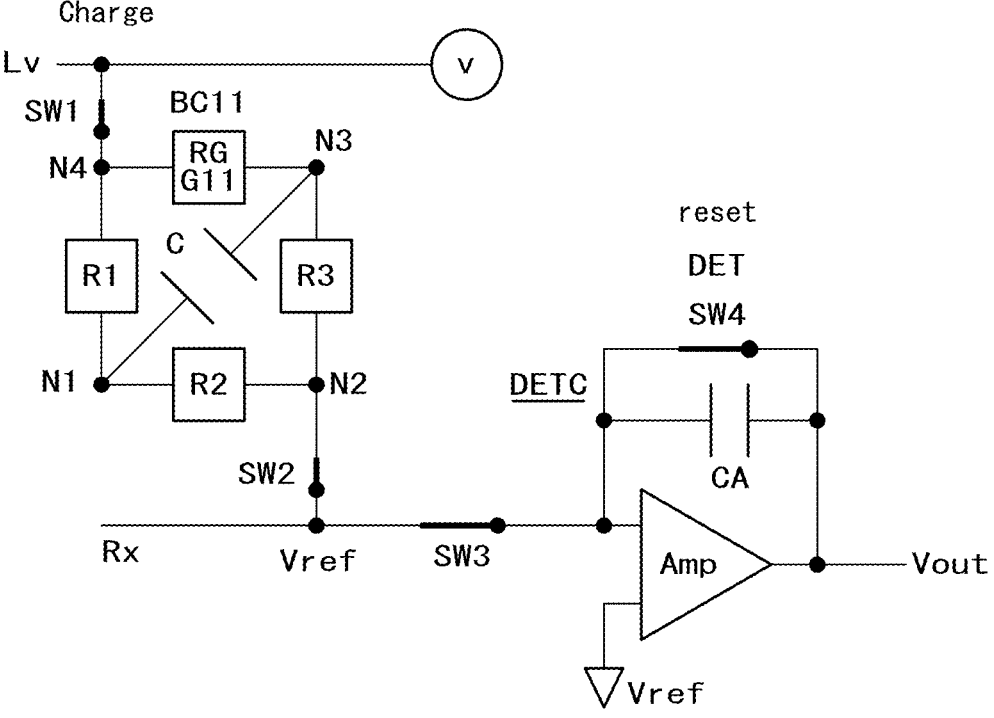
F I G . 6
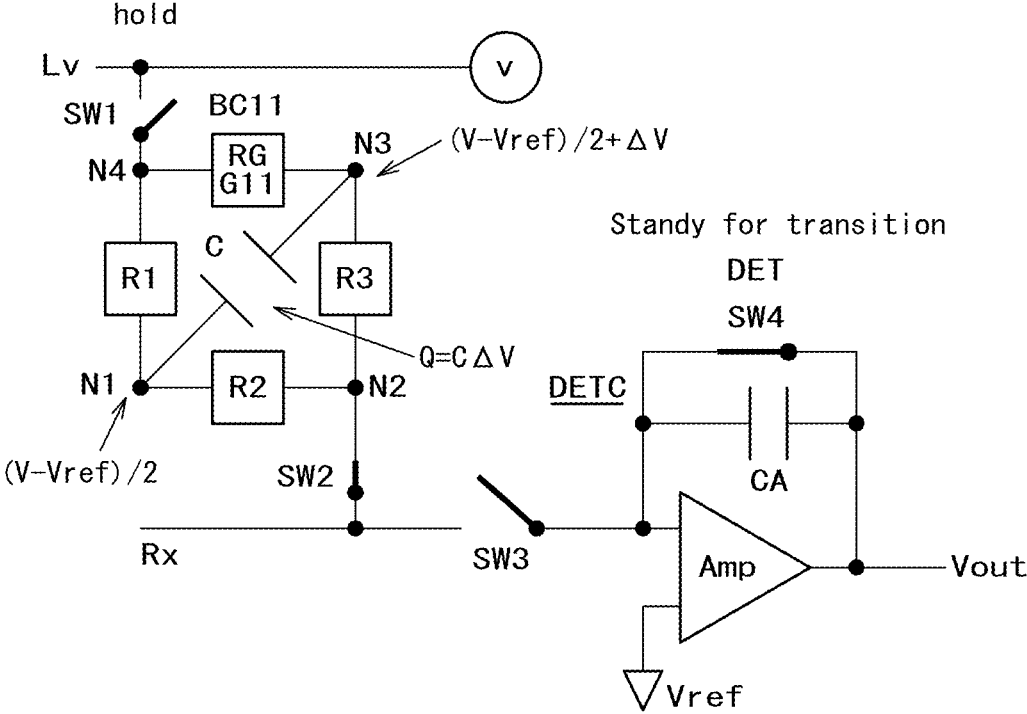

F I G 1 2
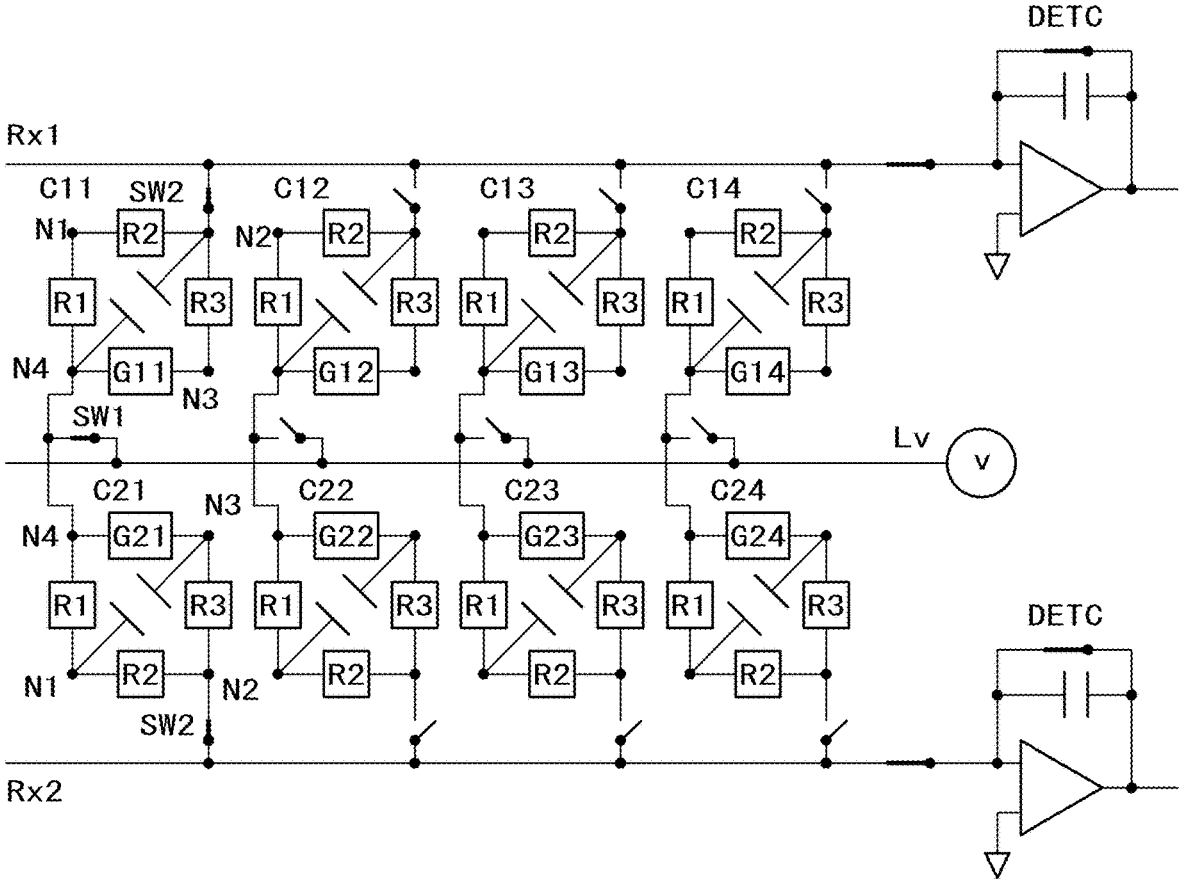

STRAIN DETECTION DEVICE WITH REDUCED NUMBER OF WIRES

CLAIM OF PRIORITY

The present application claims priority from Japanese Patent Application JP 2022-193957 filed on Dec. 5, 2022, the content of which is hereby incorporated by reference into this application.

BACKGROUND OF THE INVENTION

1. Field of the Invention

The present disclosure relates to a detection device, and is particularly applicable to a detection device including a plurality of strain sensors.

2. Description of the Related Art

Japanese Patent Laid-Open No. 1988-285434 discloses a plurality of (six in this example) Wheatstone bridge circuits each including one strain detection means.

A circuit configuration of a detection device including a sensor array with a plurality of sensors arranged in a matrix has been studied, each of the plurality of sensors including a bridge circuit including one strain sensor and three resistance elements. The results of the study indicate that a problem with the circuit configuration of the sensor array is the large number of wires in the sensor array.

An object of the present disclosure is to provide a detection device with a reduced number of wires.

Other objects and new features will be clear from the description of the specification and the attached drawings.

SUMMARY OF THE INVENTION

Representative aspects of the present disclosure will be described below in brief.

Specifically, a detection device includes: a bridge circuit including a first node to which a second end of a first reference resistance element and a first end of a second reference resistance element are connected, a second node to which a second end of the second reference resistance element and a first end of a third reference resistance element are connected, a third node to which a second end of the third reference resistance element and a first end of a strain gauge resistance element are connected, and a fourth node to which a second end of the strain gauge resistance element and a first end of the first reference resistance element are connected; a capacitance element provided between the first node and the third node; a first switch element provided between the fourth node and a reference power supply line; and a second switch element provided between the second node and a detection circuit.

BRIEF DESCRIPTION OF THE DRAWINGS

FIG. 2 is a partial circuit diagram of a sensor array according to a comparative example;

FIG. 3 is a partial circuit diagram of a sensor array according to an embodiment;

FIG. 4 is a diagram for conceptually describing a sensor array according to a variation;

FIG. 5 is a diagram illustrating a charge operation;

FIG. 6 is a diagram illustrating a hold operation;

FIG. 12 is a partial circuit diagram of the sensor array according to the variation.

DETAILED DESCRIPTION OF THE PREFERRED EMBODIMENTS

Figure 1:
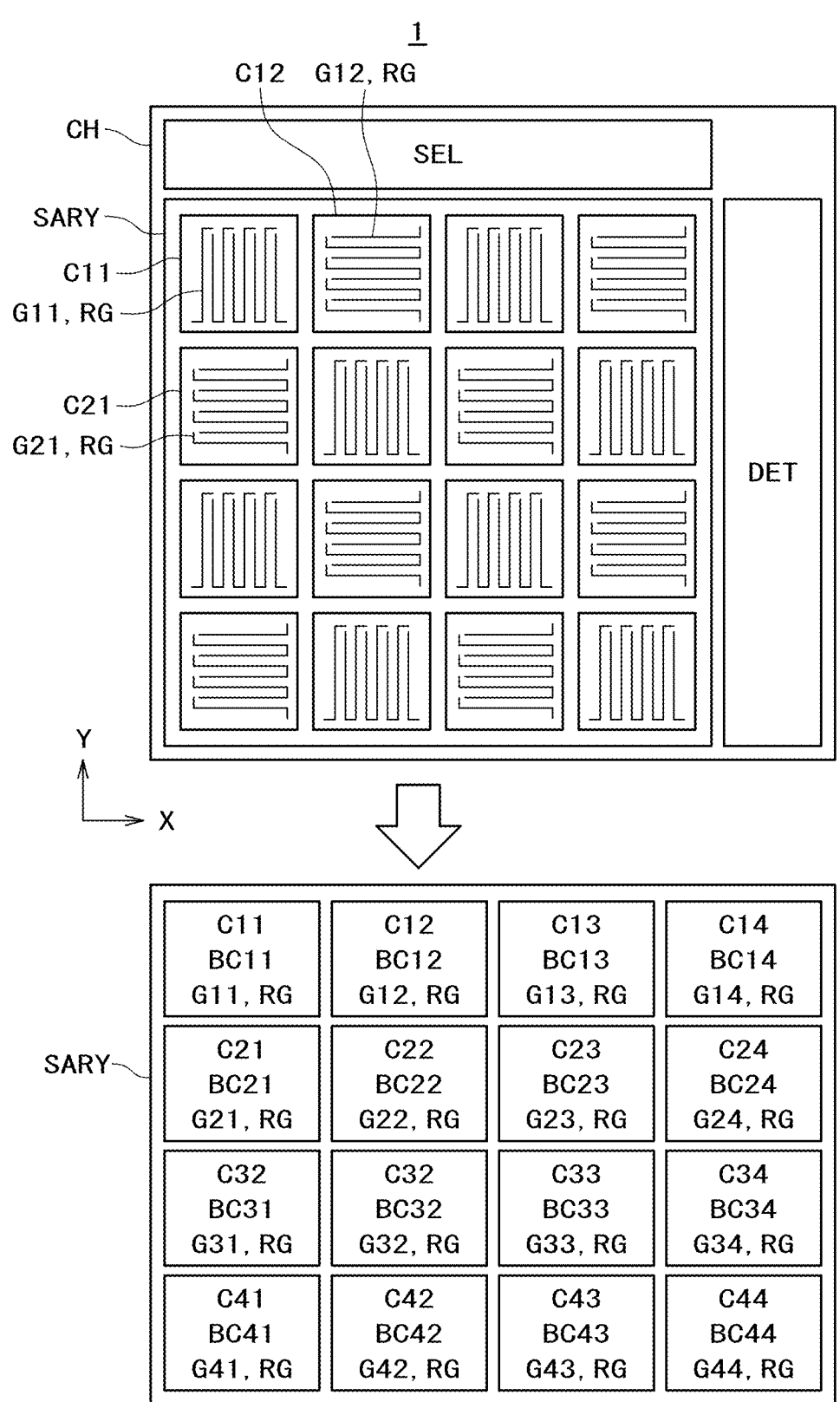
FIG. 1 is a diagram for conceptually describing a detection device according to an embodiment.

Embodiments of the present disclosure will be described below with reference to the drawings.

Note that the disclosure is only illustrative and that the scope of the present disclosure contains appropriate variations that are made by those skilled in the art with the spirits of the disclosure maintained and that are easily devised. Additionally, to make the description clearer, the drawings may schematically depict the width, thickness, shape, and the like of each component compared to actual aspects. However, the drawings are only illustrative and are not intended to limit the interpretation of the disclosure.

In addition, in the specification and the drawings, elements similar to those previously described with reference to the corresponding drawings are denoted by the same reference numerals, and detailed description of those elements is appropriately omitted.

EMBODIMENTS (Configuration Example of Detection Device)

Figure 3:
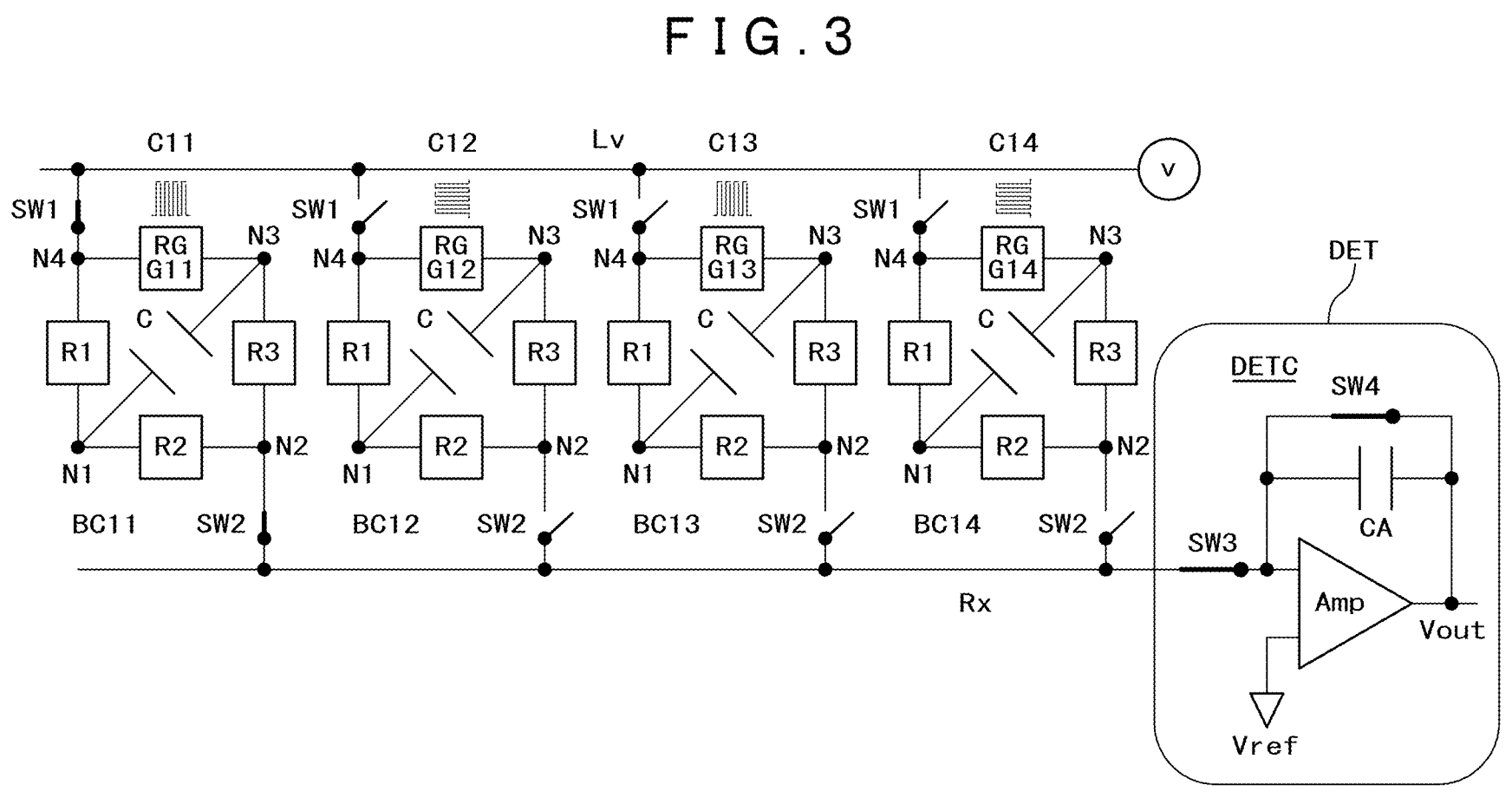

FIG. 1 is a diagram for conceptually describing a detection device according to an embodiment. FIG. 2 is a partial circuit diagram of a sensor array according to a comparative example. FIG. 3 is a partial circuit diagram according to an embodiment. FIG. 4 is a diagram for conceptually describing a sensor array according to a variation.

As illustrated in FIG. 1, a detection device 1 includes, for example, a rectangular flexible substrate CH, and a sensor array SARY, a select circuit SEL, and a detection circuit DET, which are formed on the flexible substrate CH.

The sensor array SARY includes a plurality of sensor cells Cnn (n=1 to 4) arranged in a matrix in a first direction X and a second direction Y crossing the first direction X. In this example, the sensor array SARY includes sensor cells Cnn (C11, C12, C13, C14, C21, C22, C23, C24, C24, and C44) arranged in a matrix with four rows and four columns. Each of the sensor cells Cnn includes one bridge circuit BC (BC11, BC12, BC13, BC14, BC21, BC22, BC23, BC24, BC44). Additionally, each of the bridge circuits BC includes one strain gauge G (G11, G12, G13, G14, G21, G22, G23, G24, G44). In other words, as schematically illustrated in the sensor array SARY in a lower part of FIG. 1, the sensor cell C11, described as a representative, includes the bridge circuit BC11 including the strain gauge G11. Each of the other sensor cells Cnn similarly includes a bridge circuit BCnn including the strain gauge Gnn (n=1 to 4). Each strain gauge G (G11, G12, G13, G14, G21, G22, G23, G24, . . . , G44) includes a strain gauge resistance element RG. In the sensor array SARY in an upper part of FIG. 1, to avoid complicatedness of the drawing, reference signs for the bridge circuit BCnn, the strain gauge Gnn, and the strain gauge resistance element RG are depicted in three sensors C11, C12, and C21.

Here, each of the strain gauge resistance elements RG of the strain gauges G11, G13, G22, G24, G31, G33, G42, and G44 of the sensor cells C11, C13, C22, C24, C31, C33, C42, and C44 is arranged while being oriented along the second direction Y in order to allow measurement of expansion and contraction and extension along the second direction Y. On the other hand, each of the strain gauge resistance elements RG of the strain gauges G12, G14, G21, G23, G32, G34, G41, and G43 of the sensor cells C12, C14, C21, C23, C32, C34, C41, and C43 is arranged while being oriented along the first direction X in order to allow measurement of expansion and contraction and extension along the first direction Y. Therefore, for example, there is a difference of 90° in orientation between each of the strain gauge resistance elements RG of the sensor cells C12 and C32 adjacent to the sensor cell C22 in the second direction Y and the strain gauge resistance element RG of the sensor cell C22, and between each of the strain gauge resistance elements RG of the sensor cells C21 and C23 adjacent to the sensor cell C22 in the first direction X and the strain gauge resistance element RG of the sensor cell C22. In the other sensor cells, the strain gauge resistance elements RG are arranged so as to be oriented similarly to the above description.

The select circuit SEL is provided to select one or a predetermined number of (a plurality of) sensor cells from among the plurality of sensor cells Cnn (C11, C12, C13, C14, C21, C22, C23, . . . , and C44). The select circuit SEL can be configured to select a column while sequentially changing the column in such a manner as to select the sensor cells C11, C21, C31, and C41 first, then select the sensor cells C12, C22, C32, and C42, subsequently select the sensor cells C13, C23, C33, and C43, and finally select the sensor cells C14, C24, C34, and C44.

The detection circuit DET is provided in order to read detected data from one or a predetermined number of (a plurality of) sensor cells C selected by the select circuit SEL. The detection circuit DET is configured to sequentially read detected data from a selected column in such a manner as to read detected data from the first selected sensor cells C11, C21, C31, and C41, read detected data from the subsequently selected sensor cells C12, C22, C32, and C42, read detected data from the subsequently selected sensor cells C13, C23, C33, and C43, and read detected data from the finally selected sensor cells C14, C24, C34, and C44.

(Circuit Configuration Example of Sensor Cell According to Comparative Example)

FIG. 2 illustrates a circuit configuration example of the sensor cells C11 to C14 and C21 to C24 in two rows according to the comparative example. The sensor cell C11 will be described as a representative. The sensor cell C11 includes the bridge circuit BC11 including the strain gauge G11 of the strain gauge resistance element RG. The bridge circuit BC11 includes a first reference resistance element R1, a second reference resistance element R2, a third reference resistance element R3, and the strain gauge resistance element RG. The bridge circuit BC11 includes a first node N1 to which a second end of the first reference resistance element R1 and a first end of the second reference resistance element R2 are connected, a second node N2 to which a second end of the second reference resistance element R2 and a first end of the third reference resistance element R3 are connected, a third node N3 to which a second end of the third reference resistance element R3 and a first end of the strain gauge resistance element RG are connected, and a fourth node N4 to which a second end of the strain gauge resistance element RG and a first end of the first reference resistance element R1 are connected.

The sensor cell C11 also includes a reference power supply line Lv1 to which a first reference potential V such as a power supply potential is supplied, and a reference power supply line Lg1 to which a second reference potential GND such as a ground potential is supplied. The reference power supply line Lv1 is electrically connected to the fourth node N4, and the reference power supply line Lg1 is electrically connected to the third node N3. The sensor cell C11 further includes two read lines Rx1, a switch element SW11 connected between one of the read lines Rx1 and the third node N3, and a switch element SW22 connected between the other read line Rx1 and the first node.

Here, in an unstrained state, the first reference resistance element R1, the second reference resistance element R2, the third reference resistance element R3, and the strain gauge resistance element RG have the same resistance value. On the other hand, in a strained state, the strain gauge resistance element RG has a larger or a smaller resistance value than the first reference resistance element R1, the second reference resistance element R2, and the third reference resistance element R3. The difference in resistance value appears as a potential between the third node N3 and the first node N1. Accordingly, the select circuit SEL brings the switch element SW11 and the switch element SW22 into an on state (the switches are closed) to read the potential between the third node N3 and the first node N1 on the two read lines Rx1, with the potential being detected by the detection circuit DET.

A circuit configuration illustrated in FIG. 2 requires, for one cell row, four wires including the reference power supply line Lv1, the reference power supply line Lg1, and two read lines Rx1, and there is a need to reduce the number of wires.

(Circuit Configuration Example of Sensor Cell According to Embodiment)

FIG. 3 illustrates a circuit configuration of sensor cells C11 to C14 with a reduced number of wires. The sensor cell C11 will be described as a representative. The sensor cell C11 includes the bridge circuit BC11 including the strain gauge G11 of the strain gauge resistance element RG. The bridge circuit BC11 includes the first reference resistance element R1, the second reference resistance element R2, the third reference resistance element R3, the strain gauge resistance element RG, and a capacitance element C. The bridge circuit BC11 includes the first node N1 to which the second end of the first reference resistance element R1 and the first end of the second reference resistance element R2 are electrically connected, the second node N2 to which the second end of the second reference resistance element R2 and the first end of the third reference resistance element R3 are electrically connected, the third node N3 to which the second end of the third reference resistance element R3 and the first end of the strain gauge resistance element RG are electrically connected, and the fourth node N4 to which the second end of the strain gauge resistance element RG and the first end of the first reference resistance element R1 are electrically connected. The capacitance element C is electrically connected between the first node N1 and the third node N3.

The sensor cell C11 also includes a reference power supply line Lv used as a reference power supply line to which the first reference potential V such as a power supply potential is supplied, and one read line Rx. The sensor cell C11 further includes a first switch element SW1 electrically connected between the reference power supply line Lv and the fourth node N4, and a second switch element SW electrically connected between the second node N2 and the read line Rx. The read line Rx is configured to be electrically connected to the detection circuit DET. In other words, the first switch elements SW1 of the plurality of bridge circuits BC are connected to the reference power supply line Lv, which is a common reference power supply line, and the second switch elements SW2 of the bridge circuits BC are connected to a common detection circuit DET.

The first switch element SW1 and the second switch element SW2 are electrically connected to the select circuit SEL to control an on state and an off state of the select circuit SEL. The first switch element SW1 and the second switch element SW2 can include, for example, field effect transistors such as metal-oxide-semiconductor field-effect transistors (MOSFETs).

The detection circuit DET includes, as a unit detection circuit DETC, a third switch element SW3, a fourth switch element SW4, an amplifying circuit AMP, and a capacitance element CA. The amplifying circuit AMP includes a first input terminal electrically connected to the read line Rx via the third switch element SW3, a second input terminal to which a predetermined referencing potential Vref is supplied, and an output terminal Vout. Each of the fourth switch element SW4 and a capacitance element CA is electrically connected between the first input terminal of the amplifying circuit AMP and the output terminal Vout.

Here, in the unstrained state, the first reference resistance element R1, the second reference resistance element R2, the third reference resistance element R3, and the strain gauge resistance element RG have the same resistance value. On the other hand, in the strained state, the resistance value of the strain gauge resistance element RG has a larger or a smaller resistance value than the first reference resistance element R1, the second reference resistance element R2, and the third reference resistance element R3.

The first switch element SW1 and the second switch element SW2 are set to the on state to set the fourth node N4 to the first reference potential V, while setting the second node N2 to the referencing potential Vref. The capacitance element C is charged due to a difference in potential between the third node N3 and the first node N1. In the unstrained state, the potentials of the first node N1 and the third node N3 are (V−Vref)/2. On the other hand, in the strained state, the potential of the first node N1 is (V−Vref)/2, and the potential of the third node N3 is ((V−Vref)/2)+ΔV. Here, ΔV is a variation in potential due to a variation in the resistance value of the strain gauge resistance element RG. Therefore, the capacitance element C is charged with electric charge Q=CAV. The electric charge is read by the detection circuit DET via the read line Rx to allow a variation in the resistance value of the strain gauge resistance element RG to be detected.

As illustrated in FIG. 3, when the capacitance element C is added to each bridge circuit BC as a holding capacitance, and the detection circuit DET reads out the electric charge from the capacitance element C, the device can be configured using one reference power supply line Lv1 and one read line Rx1 for one cell row, enabling a reduction in the number of wires. A read operation for the sensor cell C11 will be described with reference to FIGS. 5 to 7.

(Variation of Sensor Array)

Now, a variation of the sensor array SARY will be described with reference to FIG. 4. The configuration of the sensor array SARY is not limited to FIG. 1, and a configuration may be such that there is a difference of 45° in orientation between the adjacent strain gauge resistance elements RG, as illustrated in FIG. 4. In other words, the sensor array SARY can be configured with first sensor cells each with the strain gauge resistance element RG oriented in the first direction X, second sensor cells each with the strain gauge resistance element RG oriented in the second direction Y, and third sensor cells each with the strain gauge resistance element RG oriented in a third direction that is oriented in a direction between the first direction X (here, −X direction) and the second direction Y.

The strain gauge resistance elements RG of the strain gauges G11, G13, G22, G24, G31, G33, G42, and G44 of the sensor cells C11, C13, C22, C24, C31, C33, C42, and C44, which are the third sensor cells, are arranged while being oriented along a third direction (here, an intermediate direction) that is oriented in a direction between the first direction X (here, −X direction) and the second direction Y so as to allow measurement of expansion and contraction and extension along the third direction.

The strain gauge resistance elements RG of the strain gauges G12, G14, G32, and G34 of the sensor cells C12, C14, C32, and C34, which are the second sensor cells, are arranged while being oriented along the second direction Y so as to allow measurement of expansion and contraction and extension along the second direction Y.

The strain gauge resistance elements RG of the strain gauges G21, G23, G41, and G43 of the sensor cells C21, C23, C41, and C43, which are the first sensor cells, are arranged while being oriented along the first direction X so as to allow measurement of expansion and contraction and extension along the first direction X.

Therefore, for example, there is a difference of 45° in orientation between each of the strain gauge resistance elements RG of the sensor cells C12 and C32 adjacent to the sensor cell C22 in the second direction Y and the strain gauge resistance element RG of the sensor cell C22, and between each of the strain gauge resistance elements RG of the sensor cells C21 and C23 adjacent to the sensor cell C22 in the first direction X and the strain gauge resistance element RG of the sensor cell C22. In the other sensor cells, the strain gauge resistance elements RG are arranged so as to be oriented as described above.

(Read Operation)

Figure 7:
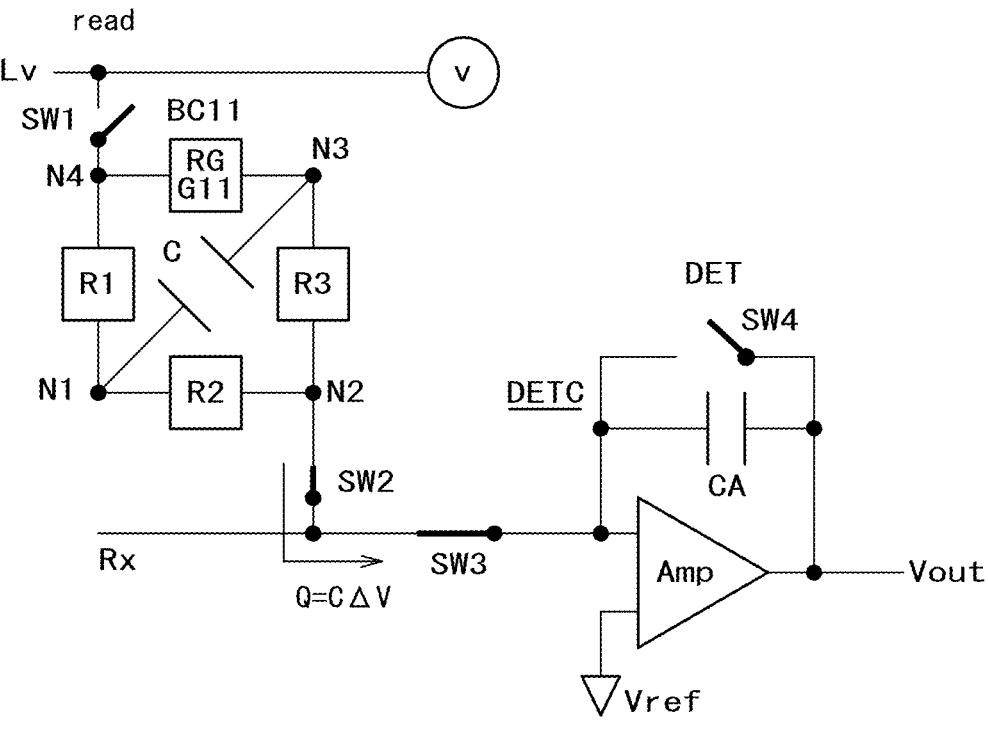
FIG. 7 is a diagram illustrating a read operation.
Figure 8:
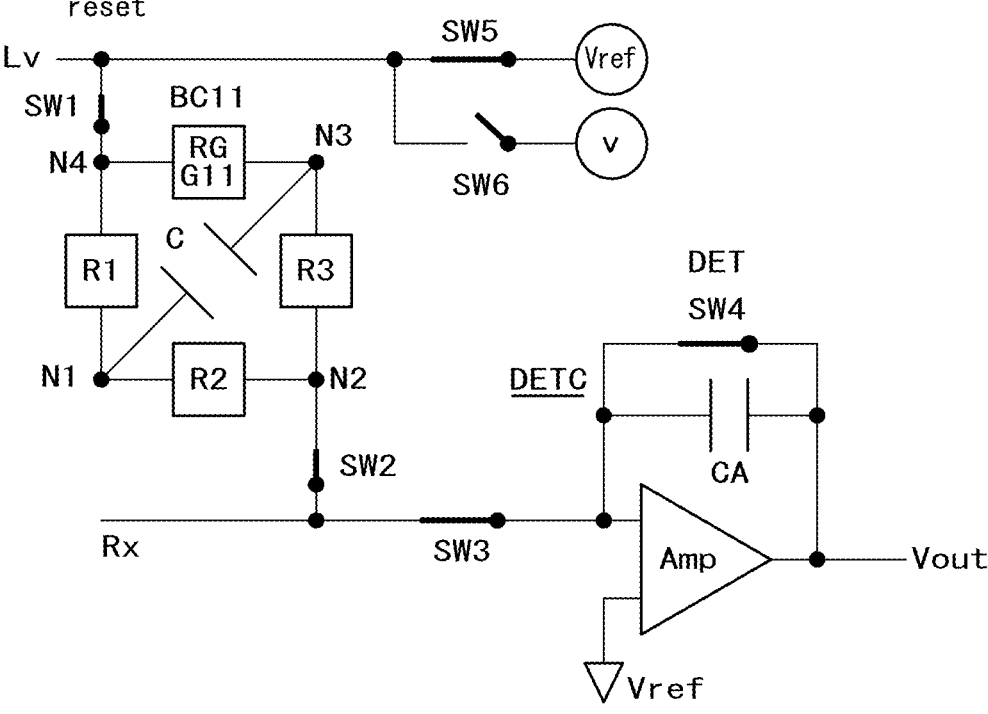
FIG. 8 is a diagram illustrating a reset operation.

Now, the read operation for the sensor cell C11 described with reference to FIG. 3 will be described using FIGS. 5 to 7. FIG. 5 is a diagram illustrating a charge operation. FIG. 6 is a diagram illustrating a hold operation. FIG. 7 is a diagram illustrating the read operation. FIG. 8 is a diagram illustrating a reset operation.

First, as illustrated in FIG. 5, to charge the capacitance element C, the select circuit SEL brings the first switch element SW1 into the on state, and brings the second switch element SW2 into the on state. On the other hand, the unit detection circuit DETC is set to a reset state, the third switch element SW3 is set to the on state, and the fourth switch element SW4 is set to the on state. The read line Rx1 is set to the referencing potential Vref. Thus, the fourth node N is set to the first reference potential V, the second node N2 is set to the referencing potential Vref, and the capacitance element C is charged due to a potential difference between the third node N3 and the first node N1.

Then, as illustrated in FIG. 6, the first switch element SW1 is set to the off state by the select circuit SEL, the third switch element SW3 of the unit detection circuit DETC is set to the off state, and the capacitance element C is set to a charge hold state. The unit detection circuit DETC is set to a standby for transition state.

At this time, in the unstrained state, the first node N1 and the third node N3 are at a potential (V−Vref)/2. On the other hand, in the strained state, the first node N1 is at the potential (V−Vref)/2, and the third node N3 is at a potential ((V−Vref)/2)+ΔV. Here, ΔV is a variation in potential due to a variation in the resistance value of the strain gauge resistance element RG. Therefore, the capacitance element C is charged with electric charge Q=CΔV.

Then, as illustrated in FIG. 7, the third switch element SW3 of the unit detection circuit DETC is set to the on state to cause the read operation for the electric charge Q=CΔV to be performed. The electric charge Q=CΔV is input (read out) to the unit detection circuit DETC via the read line Rx. Thus, the unit detection circuit DETC can output a detection signal to the output terminal Vout as a detected value.

In the charge operation in FIG. 5, the hold operation in FIG. 6, and the read operation in FIG. 7, in the sensor cells other than the sensor cell C11 in FIG. 3, that is, in the sensor cells C12, C13, and C14, the first switch element SW1 and the second switch element SW2 of each of the sensor cells C12, C13, and C14 are set to the off state by the select circuit SEL, as illustrated in FIG. 3.

The charge operation in FIG. 5, the hold operation in FIG. 6, and the read operation in FIG. 7 are performed on the sensor cells C11, C21, C31, and C41 to carry out strain detection for one column. Subsequently, the sensor cell for detection is changed to the sensor cells C12, C22, C32, and C42, and the charge operation in FIG. 5, the hold operation in FIG. 6, and the read operation in FIG. 7 are performed to carry out strain detection for one column. Subsequently, with the sensor cell for detection changed to the sensor cells C13, C23, C33, and C43, and then with the sensor cell for detection changed to the sensor cells C14, C24, C34, and C44, the detection can be performed on the sensor cells in the entire sensor array SARY illustrated in FIG. 1.

Before the charge operation in FIG. 5, the reset operation illustrated in FIG. 8 may additionally be performed to refresh the capacitance element C of the sensor cell C11 and the bridge circuit BC11 to discharge residual charge and the like accumulated in the capacitance element C of the sensor cell C11 and in the bridge circuit BC11. In this case, the reference power supply line Lv is provided with a fifth switch element SW5 connected to the referencing potential Vref and a sixth switch element SW6 connected to the first reference potential V. In this configuration, during the reset operation, the fifth switch element SW5 is set to the on state so as to supply the referencing potential Vref to the reference power supply line Lv. At this time, the switch element SW1, the switch element SW2, the third switch element SW3, and the fourth switch element SW4 are set to the on state, and the sixth switch element SW6 is set to the off state. In the charge operation in FIG. 5, the hold operation in FIG. 6, and the read operation in FIG. 7, the sixth switch element SW6 is set to the on state, and the fifth switch element SW5 is set to the off state.

(First Variation of Read Operation)

Additionally, the read operation can be performed as follows. In a first variation of the read operation, the state of plane strains occurring in the sensor array SARY at a certain point of time can be detected at one time.

1) The first switch elements SW1 and second switch elements SW2 of a plurality of bridge circuits BC are simultaneously set to the on state (the charge operation is performed on all the sensor cells).

2) Subsequently, the first switch elements SW1 of all the bridge circuits BC are set to the off state (the hold operation is performed on all the sensor cells).

3) Subsequently, the second switch elements SW2 of the plurality of bridge circuits BC are sequentially set to the on state, and the detection circuit DET is used to sequentially read detected values from the plurality of bridge circuits BC (the read operation is performed on all the sensor cells by reading detected values out from the sensor cells in order). In other words, referring to the sensor cells C11, C12, C13, and C14 in FIG. 3, first, the second switch element SW2 of the sensor cell C11 is set to the on state, and a detected value is read from the bridge circuit BC11. Subsequently, the second switch element SW2 of the sensor cell C12 is set to the on state, and a detected value is read from the bridge circuit BC12. Then, the second switch element SW2 of the sensor cell C13 is set to the on state, and a detected value is read from the bridge circuit BC13. Finally, the second switch element SW2 of the sensor cell C14 is set to the on state, and a detected value is read from the bridge circuit BC14. Additionally, referring to FIG. 1, first, the read operation is performed on the sensor cells C11, C21, C31, and C41, and subsequently the read operation is performed on the sensor cells C12, C22, C32, and C42. Subsequently, the read operation is performed on the sensor cells C13, C23, C33, and C43, and subsequently, the read operation is performed on the sensor cells C14, C24, C34, and C44. Thus, detection is performed on the sensor cells in the entire sensor array SARY illustrated in FIG. 1.

(Configuration Example of Capacitance Element of Bridge Circuit)

Figure 9:
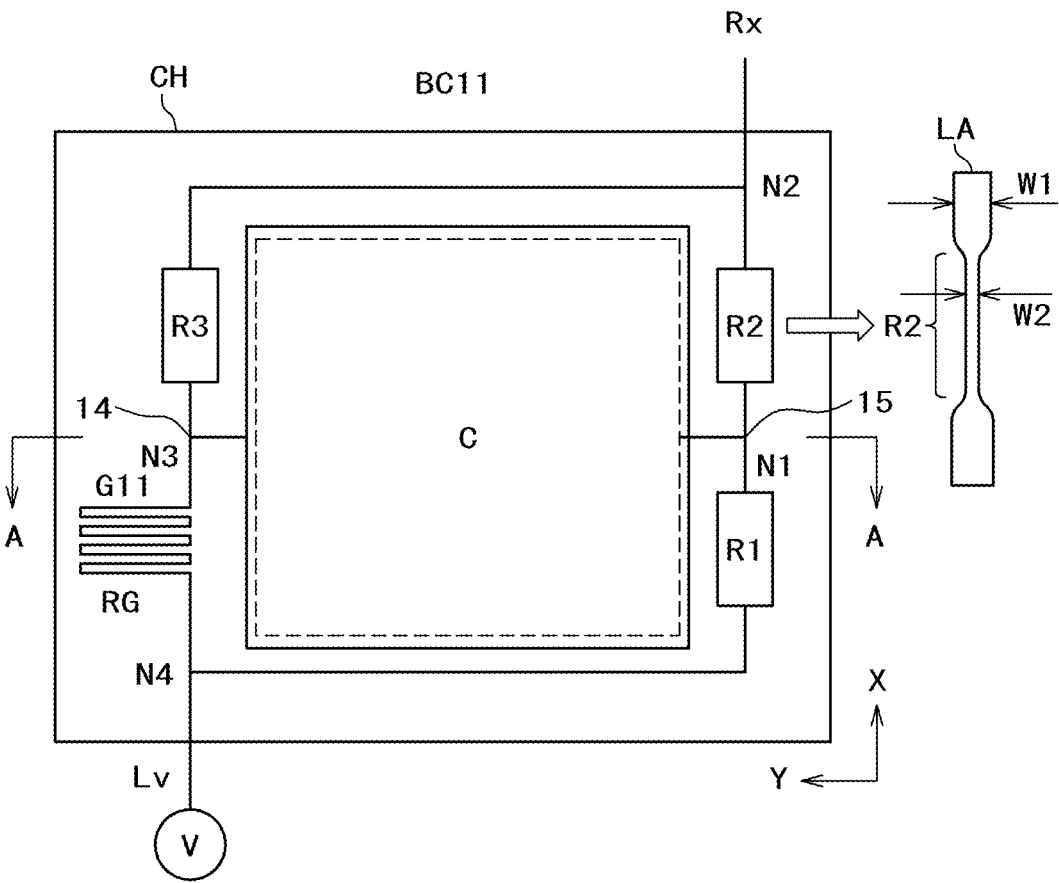
FIG. 9 is a schematic plan view for describing a planar arrangement example of a bridge circuit.
Figure 10:
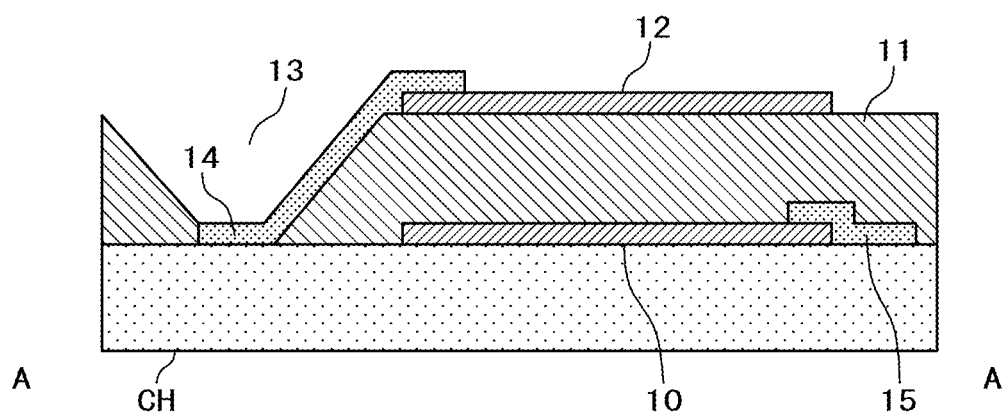
FIG. 10 is a schematic cross-sectional view along line A-A in FIG. 9.

Now, a configuration example of the capacitance element C of the bridge circuit will be described with reference to FIGS. 9 and 10. FIG. 9 is a schematic plan view for describing a planar arrangement example of the bridge circuit. FIG. 10 is a schematic cross-sectional view taken along line A-A in FIG. 9. Here, the bridge circuit BC11 of the sensor cell C11 will be described as a representative example.

As illustrated in FIG. 9, the capacitance element C of the bridge circuit BC11 is formed on the flexible substrate CH, and the first to third reference resistance elements R1 to R3 of the bridge circuit BC11 and the strain gauge resistance element RG are arranged on the flexible substrate CH in such a manner as to surround the capacitance element C. The first to third reference resistance elements R1 to R3 will be described using the reference resistance element R2 as a representative. The reference resistance element R2 can be formed by, for example, changing a first wiring width W1 of a wire LA to a second wiring width W2 that is smaller than the first wiring width W1 (W2<W1).

As illustrated in FIG. 10, the capacitance element C is structured in such a manner that a first electrode layer 10, an insulating layer 11, and a second electrode layer 12 are stacked on the flexible substrate CH in this order. The first to third reference resistance elements R1 to R3 and the strain gauge resistance element RG are arranged in such a manner as to surround the capacitance element C, and the second electrode layer 12 is electrically connected to a wire 14 between the strain gauge resistance element RG and the first reference resistance element R1 on the flexible substrate CH via a contact hole 13 in an insulating film 11. The first electrode layer 10 is electrically connected to a wire 15 on the flexible substrate CH.

(Second Variation of Read Operation)

Figure 11:
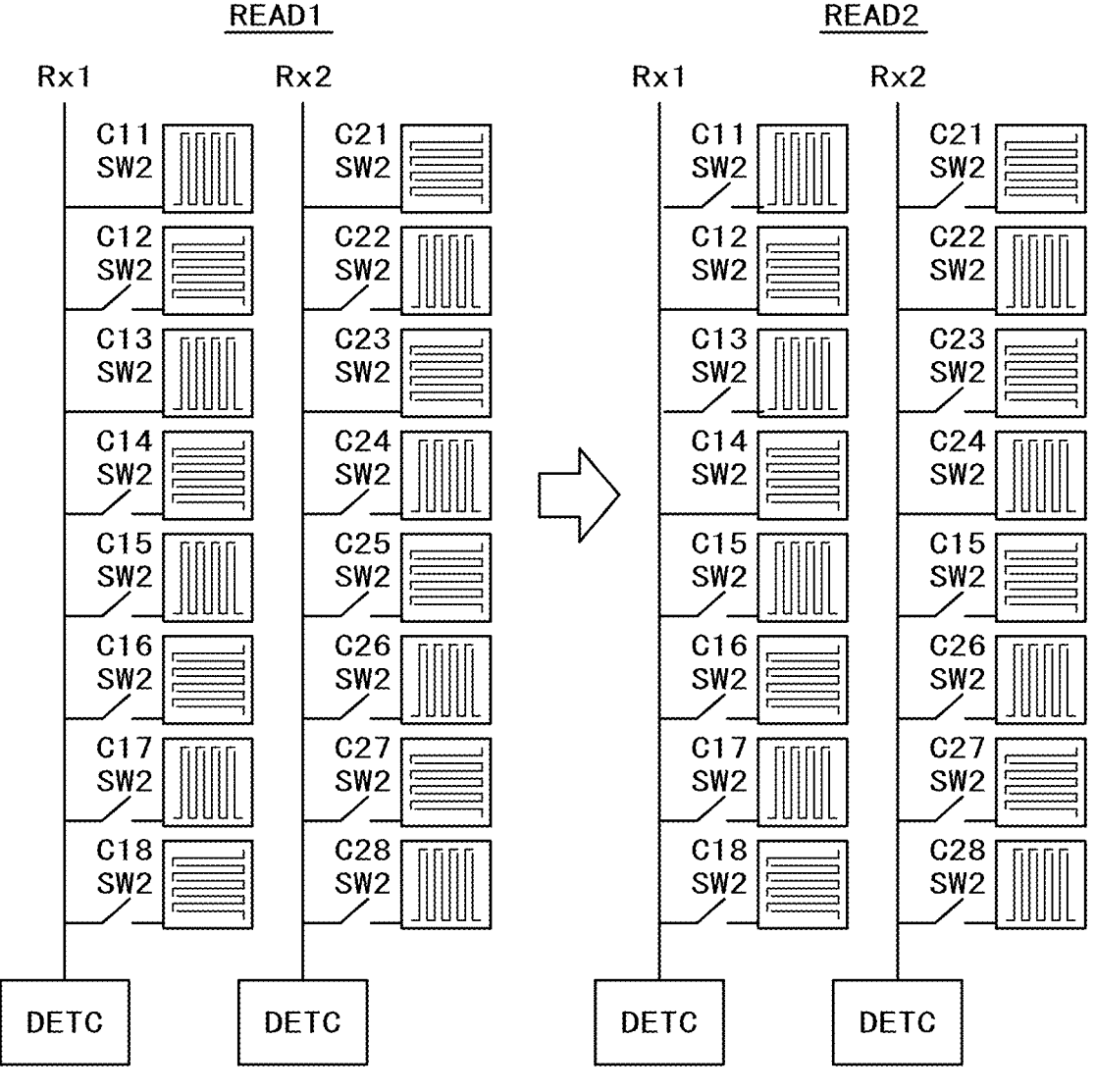
FIG. 11 is a diagram for describing a second variation of the read operation.

A second variation of the read operation will be described with reference to FIG. 11. FIG. 11 is a diagram for describing the second variation of the read operation.

FIG. 11 representatively depicts the sensor cells C11 to C18 connected to the first read line Rx1 and the sensor cells C21 to C28 connected to the second read line Rx2, and illustrates the on state or off state of the second switch element SW2 of each of the sensor cells C11 to C18 and C21 to C28 during the read operation.

During a first read operation READ1 or a second read operation READ2, the read operation is simultaneously performed on two or two or more (three, four, or the like) of the strain gauges which are connected to the same read line (Rx1 or Rx2) and for which the strain gauge resistance elements RG are arranged in an equal direction. The amount of charge (Q=CΔV) read out from the capacitance element C onto one read line (Rx1 or Rx2) is increased, and the unit detection circuit DETC is used to read a detected value from the bridge circuit of each sensor cell. In the specification, this read method is referred to as a bundled driving method.

In this example, during the first read operation READ1, the second switch elements SW2 of the two sensor cells C11 and C13 connected to the first read line Rx1 are set to the on state (the second switch elements SW2 of the other sensor cells C12 and C14 to C18 are set to the off state). Additionally, the second switch elements SW2 of the two sensor cells C21 and C23 connected to the second read line Rx2 are set to the on state (the second switch elements SW2 of the other sensor cells C22 and C24 to C28 are set to the off state). This doubles the amount of charge (Q=CΔV) read out from the capacitance element C onto one read line (Rx1, Rx2), and the unit detection circuit DETC is used to read a detected value from the bridge circuit (BC11, BC13, BC21, BC23) of each of the sensor cells (C11, C13 and C21, C23).

Additionally, during the second read operation READ2, the second switch elements SW2 of the two sensor cells C12 and C14 connected to the first read line Rx1 are set to the on state (the second switch elements SW2 of the other sensor cells C11, C13, and C15 to C18 are set to the off state). Additionally, the second switch elements SW2 of the two sensor cells C22 and C24 connected to the second read line Rx2 are set to the on state (the second switch elements SW2 of the other sensor cells C21, C23, and C25 to C28 are set to the off state). This doubles the amount of charge (Q=CΔV) read out from the capacitance element C onto one read line (Rx1, Rx2), and the unit detection circuit DETC is used to read a detected value from the bridge circuit (BC12, BC14, BC22, BC24) of each of the sensor cells (C12, C14, C22, and C24).

In the configuration in FIG. 11, the first read operation is generally performed as follows.

1) The first switch elements SW1 and the second switch elements SW2 of the plurality of bridge circuits BC of the sensor cells C11 to C18 and C21 to C28 are simultaneously set to the on state (the charge operation is performed on all the sensor cells).

2) Subsequently, the first switch elements SW1 of all the bridge circuits BC of the sensor cells C11 to C18 and C21 to C28 are set to the off state (the hold operation is performed on all the sensor cells).

3) Subsequently, the second switch elements SW2 of the plurality of bridge circuits BC of the sensor cells C11 to C18 and C21 to C28 are sequentially set to the on state, and the detection circuit DET is used to sequentially read detected values from the plurality of bridge circuits BC (the read operation is performed on all the sensor cells by reading detected values out from the sensor cells in order).

In other words, as illustrated in the first read operation READ1 in FIG. 11, the second switch elements SW2 of the two sensor cells C11 and C13 connected to the first read line Rx1 are set to the on state, and additionally, the second switch elements SW2 of the two sensor cells C21 and C23 connected to the second read line Rx2 are set to the on state. The unit detection circuit DETC is then used to read a detected value from the bridge circuit (BC11, BC13, BC21, BC23) of each of the sensor cells (C11, C13, and C21, C23).

Then, as illustrated in the second read operation READ2 in FIG. 11, the second switch elements SW2 of the two sensor cells C12 and C14 connected to the first read line Rx1 are set to the on state, and additionally, the second switch elements SW2 of the two sensor cells C22 and C24 connected to the second read line Rx2 are set to the on state. The unit detection circuit DETC is then used to read a detected value from the bridge circuit (BC12, BC14, BC22, BC24) of each of the sensor cells (C12, C14, C21, and C23).

Subsequently, as described above, in sequence, the second switch elements SW2 of the two sensor cells C15 and C17 connected to the first read line Rx1 are set to the on state, and additionally, the second switch elements SW2 of the two sensor cells C25 and C27 connected to the second read line Rx2 are set to the on state. The unit detection circuit DETC is then used to read a detected value from the bridge circuit (BC15, BC17, BC25, BC27) of each of the sensor cells (C15, C17, and C25, C27).

Finally, as described above, in sequence, the second switch elements SW2 of the two sensor cells C16 and C18 connected to the first read line Rx1 are set to the on state, and additionally, the second switch elements SW2 of the two sensor cells C26 and C28 connected to the second read line Rx2 are set to the on state. The unit detection circuit DETC is then used to read a detected value from the bridge circuit (BC16, BC18, BC26, BC28) of each of the sensor cells (C16, C18, and C26, C28).

Thus, detection is performed on the sensor cells in the entire sensor array SARY illustrated in FIG. 1.

In the bundled driving method, any two or more bridge circuits BC of the strain gauge resistance elements RG arranged in the same orientation and connected to the same read line Rx are bundled. Then, when detected values are sequentially read from the plurality of bridge circuits BC, the second switches of the bundled plurality of bridge circuits BC are simultaneously turned on, and reading is then performed. In FIG. 11, for example, on the first read line Rx1, the sensor cells C11, C13, C15, and C17 can be bundled, or the sensor cells C12, C14, C16, and C18 can be bundled. On the first read line Rx2, the sensor cells C21, C23, C25, and C27 can be bundled, or the sensor cells C22, C24, C26, and C28 can be bundled.

(Variation of Circuit Configuration of Sensor Cells)

Now, a variation of the circuit configuration of the sensor cells will be described with reference to FIG. 12. FIG. 12 is a partial circuit diagram of a sensor array according to a variation. FIG. 12 illustrates a circuit configuration example of the sensor cells C11 to C14 and C21 to C24 in two rows. In this example, one reference power supply line Lv is provided that is common to the sensor cells C11 to C14 and C21 to C24 in two rows. Additionally, between the reference power supply line Lv and the fourth node N4 of the sensor cell C11 and the fourth node N4 of the sensor cell C21, one first switch element SW1 is provided that is common to the reference power supply line Lv and the fourth nodes N4. Moreover, between the reference power supply line Lv and the fourth node N4 of the sensor cell C12 and the fourth node N4 of the sensor cell C22, one first switch element SW1 is provided that is common to the reference power supply line Lv and the fourth nodes N4. Moreover, between the reference power supply line Lv and the fourth node N4 of the sensor cell C13 and the fourth node N4 of the sensor cell C23, one first switch element SW1 is provided that is common to the reference power supply line Lv and the fourth nodes N4. Moreover, between the reference power supply line Lv and the fourth node N4 of the sensor cell C14 and the fourth node N4 of the sensor cell C24, one first switch element SW1 is provided that is common to the reference power supply line Lv and the fourth nodes N4.

The configuration as described above allows provision of a detection device including a sensor array with a reduced number of reference power supply lines Lv.

The scope of the present disclosure includes all detection devices that may be implemented by those skilled in the art through appropriate design and variation on the basis of the detection device described as the embodiment of the present disclosure as long as the implemented detection devices embrace the spirits of the present disclosure.

In the range of concepts of the present disclosure, those skilled in the art could devise many variations, and it is comprehended that the variations belong to the scope of the disclosure. For example, the range of the present disclosure includes each of the above-described embodiments on which, for example, those skilled in the art have appropriately performed addition or deletion of a component or design change or addition or omission of a step or condition change, as long as the embodiment includes the spirits of the present disclosure.

Additionally, it is of course comprehended that the present disclosure produces other effects which are made by aspects described in the present embodiment and which are clear from the description of the specification, or which could be appropriately devised by those skilled in the art.

Various disclosures can be formed by appropriately combining a plurality of the components disclosed in the embodiments described above. For example, some of all the components disclosed in the embodiments may be deleted. Furthermore, components of different embodiments may be appropriately combined with each other.

What is claimed is:

1. A detection device comprising:
a bridge circuit including a first node to which a second end of a first reference resistance element and a first end of a second reference resistance element are connected, a second node to which a second end of the second reference resistance element and a first end of a third reference resistance element are connected, a third node to which a second end of the third reference resistance element and a first end of a strain gauge resistance element are connected, and a fourth node to which a second end of the strain gauge resistance element and a first end of the first reference resistance element are connected;
a capacitance element provided between the first node and the third node;
a first switch element provided between the fourth node and a reference power supply line; and a second switch element provided between the second node and a detection circuit.

2. The detection device according to claim 1, wherein after both the first switch element and the second switch element are turned on, the first switch element is turned off and the second switch element is kept in an on state, the detection circuit is used to read charge in the capacitance element.

3. The detection device according to claim 1, further comprising:
a plurality of the bridge circuits, wherein
the first switch element of each of the bridge circuits is connected to a common reference power supply line, and the second switch element of each of the bridge circuits is connected to the detection circuit that is common to the second switch elements.

4. The detection device according to claim 3, wherein the first switch elements and the second switch elements of a plurality of the bridge circuits are simultaneously turned on,
subsequently, the first switch elements of all the bridge circuits are turned off, and
subsequently, the second switch elements of the plurality of bridge circuits are sequentially turned on, and the detection circuit is used to sequentially read detected values from a plurality of the bridge circuits.

5. The detection device according to claim 4, wherein when the detected values are sequentially read from the plurality of bridge circuits, the second switch elements of any two or more of the bridge circuits are simultaneously turned on, and reading is performed.

6. The detection device according to claim 5, wherein for any two or more of the bridge circuits, the bridge circuits of the strain gauge resistance elements arranged in a same orientation are bundled.

7. The detection device according to claim 1, wherein the capacitance element of each bridge circuit is structured in such a manner that a first electrode layer, an insulating layer, and a second electrode layer are stacked on a flexible substrate in this order,
the first reference resistance element, the second reference resistance element, the third reference resistance element, and the strain gauge resistance element are arranged on the flexible substrate in such a manner as to surround the capacitance element, and
the second electrode layer is connected to a wire between the strain gauge resistance element and the first reference resistance element on the flexible substrate via a contact hole in the insulating film.

8. The detection device according to claim 3, wherein there is a difference of 90° in orientation between adjacent strain gauge resistance elements.

9. The detection device according to claim 3, wherein there is a difference of 45° in orientation between adjacent strain gauge resistance elements.

* * * * *